(12) United States Patent
Horii

(10) Patent No.: US 10,394,775 B2
(45) Date of Patent: Aug. 27, 2019

(54) ORDER CONSTRAINT FOR TRANSACTION PROCESSING WITH SNAPSHOT ISOLATION ON NON-TRANSACTIONAL NOSQL SERVERS

(71) Applicant: INTERNATIONAL BUSINESS MACHINES CORPORATION, Armonk, NY (US)

(72) Inventor: Hiroshi Horii, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 538 days.

(21) Appl. No.: 14/980,104

(22) Filed: Dec. 28, 2015

(65) Prior Publication Data

US 2017/0185636 A1    Jun. 29, 2017

(51) Int. Cl.
| | |
|---|---|
| G06F 7/02 | (2006.01) |
| G06F 16/00 | (2019.01) |
| G06F 16/22 | (2019.01) |
| G06F 9/46 | (2006.01) |
| G06F 16/951 | (2019.01) |
| G06F 16/23 | (2019.01) |
| G06F 16/11 | (2019.01) |

(52) U.S. Cl.
CPC .............. G06F 16/22 (2019.01); G06F 9/466 (2013.01); G06F 16/128 (2019.01); G06F 16/2365 (2019.01); G06F 16/951 (2019.01)

(58) Field of Classification Search
CPC ......... G06F 17/30371; G06F 17/30377; G06F 17/30353; G06F 9/466; G06F 17/30348; G06F 2201/84; G06F 17/30345; G06F 17/30864; G06F 17/30088; G06F 2201/87; G06F 16/2365; G06F 16/2379; G06F 16/2322; G06F 16/2308; G06F 16/23; G06F 16/951; G06F 16/128
See application file for complete search history.

(56) References Cited

U.S. PATENT DOCUMENTS

| | | | |
|---|---|---|---|
| 6,980,998 B2 * | 12/2005 | Kamen | ................. G06F 16/289 |
| 6,990,503 B1 | 1/2006 | Luo et al. | |
| 8,468,132 B1 | 6/2013 | O'Neill et al. | |

(Continued)

OTHER PUBLICATIONS

Peng, D. et al., "Large-scale Incremental Processing Using Distributed Transactions and Notifications" Proceedings of the 9th USENIX Symposium on Operating Systems Design and Implementation, USENIX (2010) pp. 1-14.

(Continued)

*Primary Examiner* — Bruce M Moser
(74) *Attorney, Agent, or Firm* — Tutunjian & Bitetto, P.C.; Vazken Alexanian

(57) ABSTRACT

A method of managing a commitment time that includes providing at least a first client and a second client in communication with at least a transaction management server in an NoSQL environment; and determining with the transaction management server when the first client reads a value in a first transaction that is being updated by the second client in a second transaction whether the value has been committed. If it is determined that the value has not been committed, the transaction management server causes the second client to commit after the start time of the first transaction.

20 Claims, 12 Drawing Sheets

(56) References Cited

U.S. PATENT DOCUMENTS

| | | | |
|---|---|---|---|
| 8,805,984 B2 | 8/2014 | Markus et al. | |
| 8,965,861 B1 | 2/2015 | Shalla et al. | |
| 9,100,330 B1 | 8/2015 | Noveck | |
| 9,141,930 B2* | 9/2015 | Suvernev | G06F 9/466 |
| 9,798,590 B2* | 10/2017 | Akkary | G06F 9/3834 |
| 9,990,391 B1 | 6/2018 | Cole et al. | |
| 10,198,346 B1 | 2/2019 | Cole et al. | |
| 2007/0226196 A1 | 9/2007 | Adya et al. | |
| 2009/0171962 A1 | 7/2009 | Goodman et al. | |
| 2010/0185847 A1 | 7/2010 | Shasha et al. | |
| 2012/0150802 A1 | 6/2012 | Popov et al. | |
| 2012/0179877 A1 | 7/2012 | Shriraman et al. | |
| 2013/0060742 A1 | 3/2013 | Chang et al. | |
| 2013/0110883 A1 | 5/2013 | Junqueira et al. | |
| 2013/0124475 A1* | 5/2013 | Hildenbrand | G06F 17/30351 707/636 |
| 2014/0006464 A1 | 1/2014 | Pitts | |
| 2014/0330767 A1 | 11/2014 | Fowler | |
| 2015/0074070 A1 | 3/2015 | Bortnikov et al. | |
| 2015/0172412 A1 | 6/2015 | Escriva et al. | |
| 2015/0193264 A1 | 7/2015 | Hutton et al. | |
| 2015/0277969 A1 | 10/2015 | Strauss et al. | |
| 2016/0048703 A1 | 2/2016 | Brandenburger et al. | |
| 2016/0050146 A1 | 2/2016 | Henderson | |
| 2016/0077901 A1 | 3/2016 | Roth et al. | |
| 2016/0086260 A1 | 3/2016 | Vermeulen et al. | |
| 2016/0308882 A1 | 10/2016 | Bortnikov et al. | |
| 2016/0378819 A1 | 12/2016 | Bishop et al. | |
| 2017/0109394 A1* | 4/2017 | Chang | G06F 17/30353 |

OTHER PUBLICATIONS

Gomez Ferro, D. et al., "Lock-free Transactional Support for Distributed Data Stores" 2014 IEEE 30th International Conference onData Engineering (ICDE) (Mar.-Apr. 2014) pp. 676-687.

U.S. Office Action issued in U.S. Appl. No. 14/960,913, dated Jun. 14, 2018, pp. 1-22.

U.S. Advisory Action issued in U.S. Appl. No. 14/960,913, dated Apr. 2, 2019, pp. 1-7.

U.S. Non-Final Office Action issued in U.S. Appl. No. 14/960,913, dated May 29, 2019, pp. 1-21.

* cited by examiner

ORDER CONSTRAINT FOR TRANSACTION PROCESSING WITH SNAPSHOT ISOLATION ON NON-TRANSACTIONAL NOSQL SERVERS

BACKGROUND

Technical Field

The present disclosure relates generally to NoSQL databases and, in particular, to order constraints for processing transactions in non-transactional NoSQL environments.

Description of the Related Art

NoSQL (originally referring to "non SQL" or "non relational") database provides a mechanism for storage and retrieval of data that is modeled in means other than the tabular relations used in relational databases. Motivations for this approach include: simplicity of design, simpler "horizontal" scaling to clusters of machines, which is a problem for relational databases, and finer control over availability. The data structures used by NoSQL databases (e.g. key-value, graph, or document) differ slightly from those used by default in relational databases, making some operations faster in NoSQL and others faster in relational databases. NoSQL databases are increasingly used in big data and real-time web applications.

SUMMARY

According to an aspect of the present principles, a method is provided for using order constraints for processing transactions with snapshot isolation on non-transactional NoSQL servers. In one embodiment, a method of managing a commitment time is provided that includes receiving communications from at least a first client and a second client in communication with at least a transaction management server in an NoSQL environment. The method may further include determining with the transaction management server when the first client reads a value in a first transaction that is being updated by the second client in a second transaction whether the value has been committed. If it is determined that the value has not been committed, the transaction management server causes the second client to commit after the start time of the first transaction. In some embodiments, if the value has not been committed, the first client notifies the transaction management server of a time that is after the start time, as a commitment time, and when the second client issues a commitment request for the value, the transaction management server delays the commitment of the value until at or after the commitment time.

In another aspect of the present disclosure, a system for managing a commitment time in a NoSQL environment is provided that includes a time stamp server for managing time stamps comprised of start timestamps and commit timestamps to at least a first client and a second client; and a data storage server that at least the first client and the second client can read and write data to. In some embodiments, the system further includes a transaction management server that determines when a first client reads a value from the data storage server in a first transaction that is being updated by the second client in a second transaction whether the value has been committed, wherein if it is determined that the value has not been committed, the transaction management server causes the second client to commit after the start time of the first transaction.

In yet another embodiment, a non-transitory computer readable storage medium including a computer readable program provided for managing a commitment time in a NoSQL environment, wherein the computer readable program when executed on a computer causes the computer to perform the steps of receiving communication from at least a first client and a second client with at least a transaction management server in NoSQL environment; and determining with the transaction management server when said first client reads a value in a first transaction that is being updated by the second client in a second transaction whether the value has been committed. If it is determined that the value has not been committed, the transaction management server causes the second client to commit after the start time of the first transaction.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
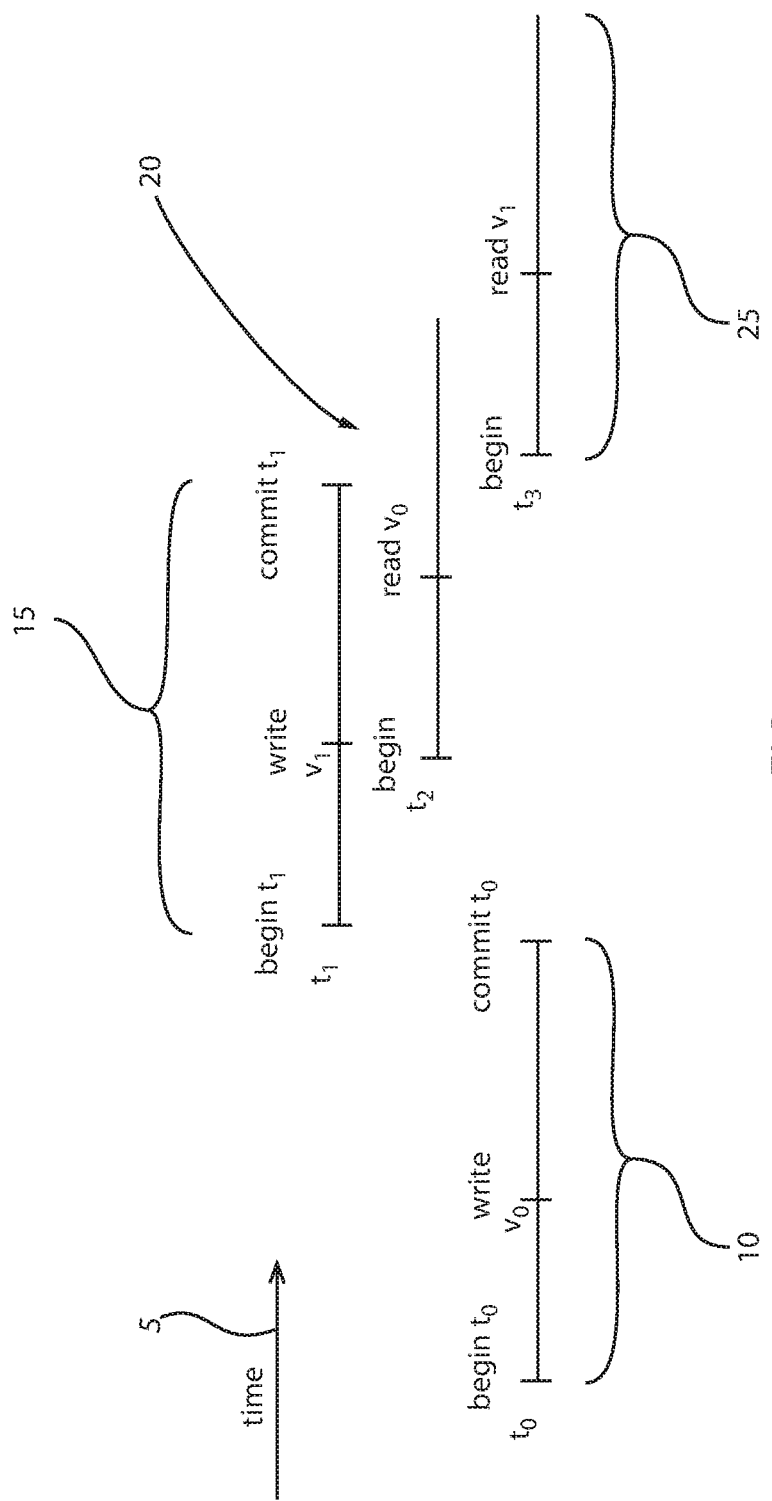
FIG. 1 is a schematic illustrating snapshot isolation for data access as used in a NoSQL database service, in accordance with one embodiment of the present disclosure.

The present principles are related to processing transactions in NoSQL databases. NoSQL, which encompasses a wide range of technologies and architectures, seeks to solve the scalability and big data performance issues that relational databases weren't designed to address. In accordance with some embodiments of the present disclosure, it can be assumed that multiple database servers provide a service of a NoSQL database.

A NoSQL database environment is a non-relational and largely distributed database system that enables rapid, ad-hoc organization and analysis of extremely high-volume, disparate data types. NoSQL databases are sometimes referred to as cloud databases, non-relational databases, Big Data databases and a myriad of other terms and were developed in response to the sheer volume of data being generated, stored and analyzed by modern users (user-generated data) and their applications (machine-generated data).

In general, NoSQL databases have become the first alternative to relational databases, with scalability, availability, and fault tolerance being key deciding factors. They go well beyond the more widely understood legacy, relational databases (such as Oracle, SQL Server and DB2 databases) in satisfying the needs of today's modern business applications. A very flexible and schema-less data model, horizontal scalability, distributed architectures, and the use of languages and interfaces that are "not only" SQL typically characterize this technology. Contrary to misconceptions caused by its name, NoSQL does not prohibit structured query language (SQL). While it's true that some NoSQL systems are entirely non-relational, others simply avoid selected relational functionality such as fixed table schemas and join operations. For example, instead of using tables, a NoSQL database might organize data into objects, key/value pairs or tuples.

There are four general types of NoSQL databases, each with their own specific attributes:

Graph database—Based on graph theory, these databases are designed for data whose relations are well represented as a graph and has elements which are interconnected, with an undetermined number of relations between them. Examples include: Neo4j and Titan.

Key-Value store—we start with this type of database because these are some of the least complex NoSQL options. These databases are designed for storing data in a schema-less way. In a key-value store, all of the data within consists of an indexed key and a value, hence the name. Examples of this type of database include: Cassandra, DyanmoDB, Azure Table Storage (ATS), Riak, BerkeleyDB.

Column store—(also known as wide-column stores) instead of storing data in rows, these databases are designed for storing data tables as sections of columns of data, rather than as rows of data. While this simple description sounds like the inverse of a standard database, wide-column stores offer very high performance and a highly scalable architecture. Examples include: HBase, BigTable and HyperTable.

Document database—expands on the basic idea of key-value stores where "documents" contain more complex in that they contain data and each document is assigned a unique key, which is used to retrieve the document. These are designed for storing, retrieving, and managing document-oriented information, also known as semi-structured data. Examples include: MongoDB and CouchDB.

Major NoSQLs do not support transactions. As used herein, a "transaction" comprises a set of data manipulation operations on the state of a database system managed as a single unit of work, so all the operations must either entirely be completed (committed) or have no effect (aborted). In other words, partial executions of the transaction are not defined (nor desired in general) because the final state of the database can be corrupted. Without the support for transactions, developers can be burdened with ensuring atomic execution of scattered changes in data upon failures as well as when there are concurrent accesses to the same data by multiple clients. In order to process transactions, conventional database systems provide a specific component called the Transaction Manager. The goal of transaction managers in general is to guarantee the so-called ACID properties of transactions: Atomicity, Consistency, Isolation and Durability. However, ACID properties are hard to scale when databases have to deal with very large amounts of data and thousands of concurrent users, because the data must be partitioned, distributed and replicated. That is one of the reasons why, with the advent of NoSQL big data stores, transactions were initially left out of the equation. HBase, Dynamo, BigTable, PNUTS, Cassandra, etc. lacked this precious feature initially. However, with the popularization of NoSQL big datastores in many areas of the industry, the need for transactions has become advantageous for certain applications. For example, as applications become larger and more complex, transactions are sometimes needed to maintain consistency of the application.

In some embodiments, the methods, systems and computer program products that are disclosed herein can provide for order constraints for snapshot isolation on non-transactional NoSQL databases. Snapshot isolation is a popular level of isolation and consistency of transactions for modern databases. In databases, and transaction processing (transaction management), "snapshot isolation" is a guarantee that all reads made in a transaction will see a consistent snapshot of the database (in practice it reads the last committed values that existed at the time it started), and the transaction itself will successfully commit only if no updates it has made conflict with any concurrent updates made since that snapshot. Snapshot isolation reduces validation errors. In some examples, when a transaction T is started at the start timestamp (Ts or $T_{start}$) and committed at a commit timestamp (Tc or $T_{commit}$), all of the committed values at the start timestamp ($T_{start}$) are available for the transaction T, and updates in the transaction T must be available for the other transactions that start after the commit timestamp ($T_{commit}$). Therefore, in the interest of maintaining consistency of transactions, clocking the start timestamp ($T_{start}$) and the commit timestamp ($T_{commit}$) can be critical.

FIG. 1 is a schematic illustrating snapshot isolation for data access as used in a NoSQL database service. The snapshot isolation schematic includes a time scale in which increasing time is in the direction indicated by the arrow having reference number 5. The snapshot isolation schematic illustrates a time sequence of four transactions 10, 15, 20, 25. For example, the transaction at time 0 ($t_0$) is a first write transaction 10 and the transaction at time 1 ($t_1$) is a second write transaction 15. In one example, the transaction at time 2 ($t_2$) is a first read transaction 20, and the transaction at time 3 ($t_3$) is a second read transaction 25. In some embodiments, when the first transaction to (first write transaction 10) and the second transaction $t_1$ (second write transaction 15) update a value with a first version ($v_0$) and a second version ($v_1$); and the first read transaction 20 ($t_2$) and second read transaction 25 ($t_3$) attempt to read the value;

during the first read transaction 20 ($t_2$) reads the first version ($v_\theta$) from the first transaction to (first write transaction 10), because the first read transaction 20 ($t_2$) starts before the end, i.e., commit $t_1$, of the second write transaction 1 ($t_3$), but after the end of the first transaction to (first write transaction 10), i.e., commit to.

In some embodiments, when the first transaction to (first write transaction 10) and the second transaction $t_1$ (second write transaction 15) update a value with a first version ($v_\theta$) and a second version ($v_1$); and the first read transaction 20 ($t_2$) and second read transaction 25 ($t_3$) attempt to read the value; during the second read transaction 25 ($t_3$) reads the second version ($v_1$) from the second transaction $t_1$ (second write transaction 15), because the second read transaction 25 ($t_c$) starts after the end of the second transaction $t_1$ (second write transaction 15), i.e., commit $t_1$.

Figure 2:
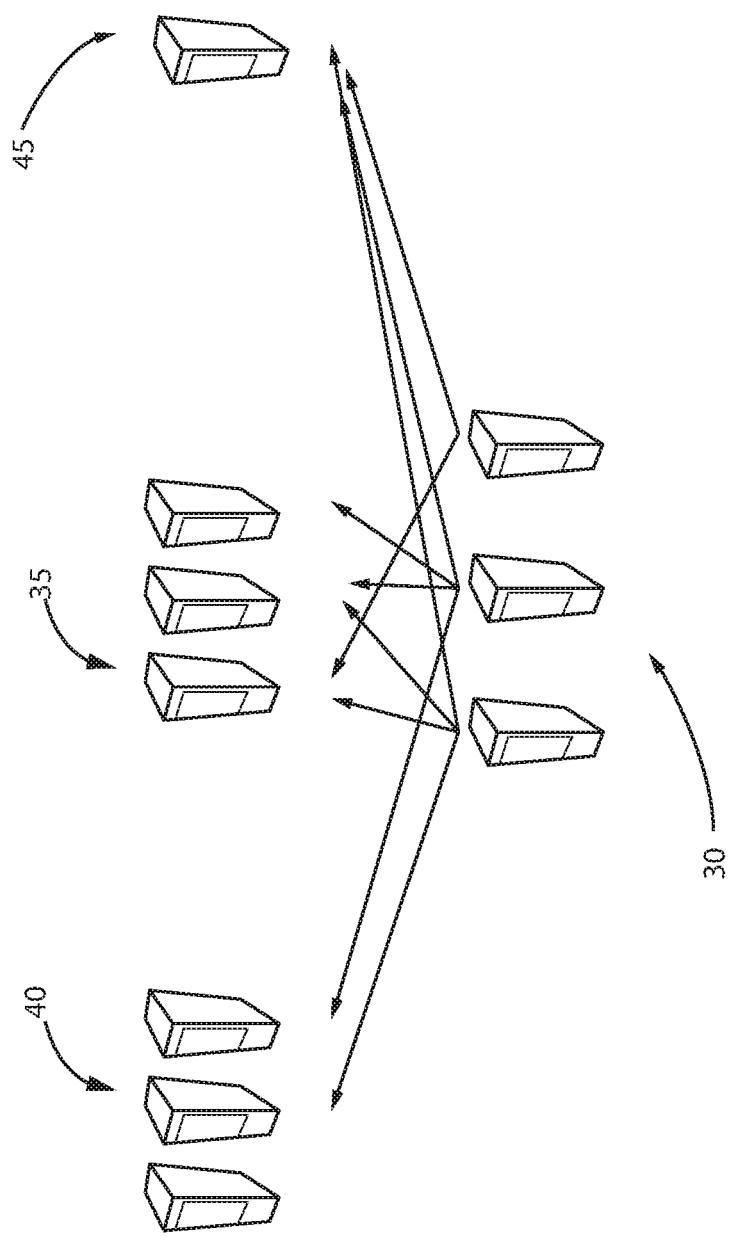
FIG. 2 is a schematic illustrating mapping between clients, database storage servers, transaction management servers, and time stamp servers in a system that employs order constraints for transaction processing with snapshot isolation on non-transactional NoSQL servers, in accordance with one embodiment of the present disclosure.

FIG. 2 illustrates mapping between a client 30, database storage servers 35, transaction management servers 40, and time stamp servers 45 in a system that employs order constraints for transaction processing with snapshot isolation on non-transactional NoSQL servers. When data storage servers 35, transaction management servers 40, and timestamp servers 45 are isolated, the clients 30 need to coordinate them to recognize when a value in the data storage servers (DS) 35 becomes available. The clients 30 execute transactions with snapshot isolation (SI) by communicating with the transaction management servers 40 (TM servers), data storage servers 35 (DS servers), and a timestamp server 45 (TS servers). The transaction management servers 40 manage states of a transaction. Every client 30 can know and change a state of a transaction by calling functions of one or more transaction management servers 40 (TM servers). In one embodiment, the data storage servers (DS) 35 manage data. Clients 30 can read and write each portion of the data by calling functions of one or more of the data storage severs 35 (DS servers). In some embodiments, the data may not be committed. The time stamp servers 45 manages time stamps. Clients can get unique time stamps by calling a function of the time stamp server 45. In some embodiments, when a client 30 gets data from the data storage server (DS) 35, the client can investigate whether the data is committed or not, and when the data is committed by communicating with the transaction management servers 40 (TM servers). The transaction management servers 40 (TM servers), data storage servers 35 (DS servers), and a timestamp server 45 (TS servers) may be in NoSQL database servers.

In some embodiments, a client 30 gets a commit timestamp ($T_{committed}$ or $T_C$) for a transaction T and sends that information to a transaction management server 40 (TM server). In database transaction, when the system processes a COMMIT statement, i.e., provides a commit timestamp ($T_{committed}$ or $T_C$), the transaction ends with successful completion. The transaction management server 40 determines whether the transaction (T) has been committed, e.g., at $T_{comitted}$. A first time lag (L1), i.e., first time period, exists between the commit timestamp ($T_{committed}$ or $T_C$) and the actual time of commitment for the transaction (T). The client 30 stores updates of the transactions (T) in the data storage servers 35 (DS servers) before receiving the commit timestamp ($T_{committed}$ or $T_C$) from the timestamp server (TS server) 45. Therefore, a second time lag (L2) exits between the data store time and the commit timestamp ($T_{committed}$). When a second or other client fetches a value updated in the transaction T in the data storage servers 35 (DS servers), the client must call the transaction management server 40 about the commit timestamp ($T_{committed}$ or $T_C$) of the transaction for Snapshot Isolation. If the transaction management server 40 (TM server) has not determined the commitment of the transaction T, the client must wait.

Figure 3:
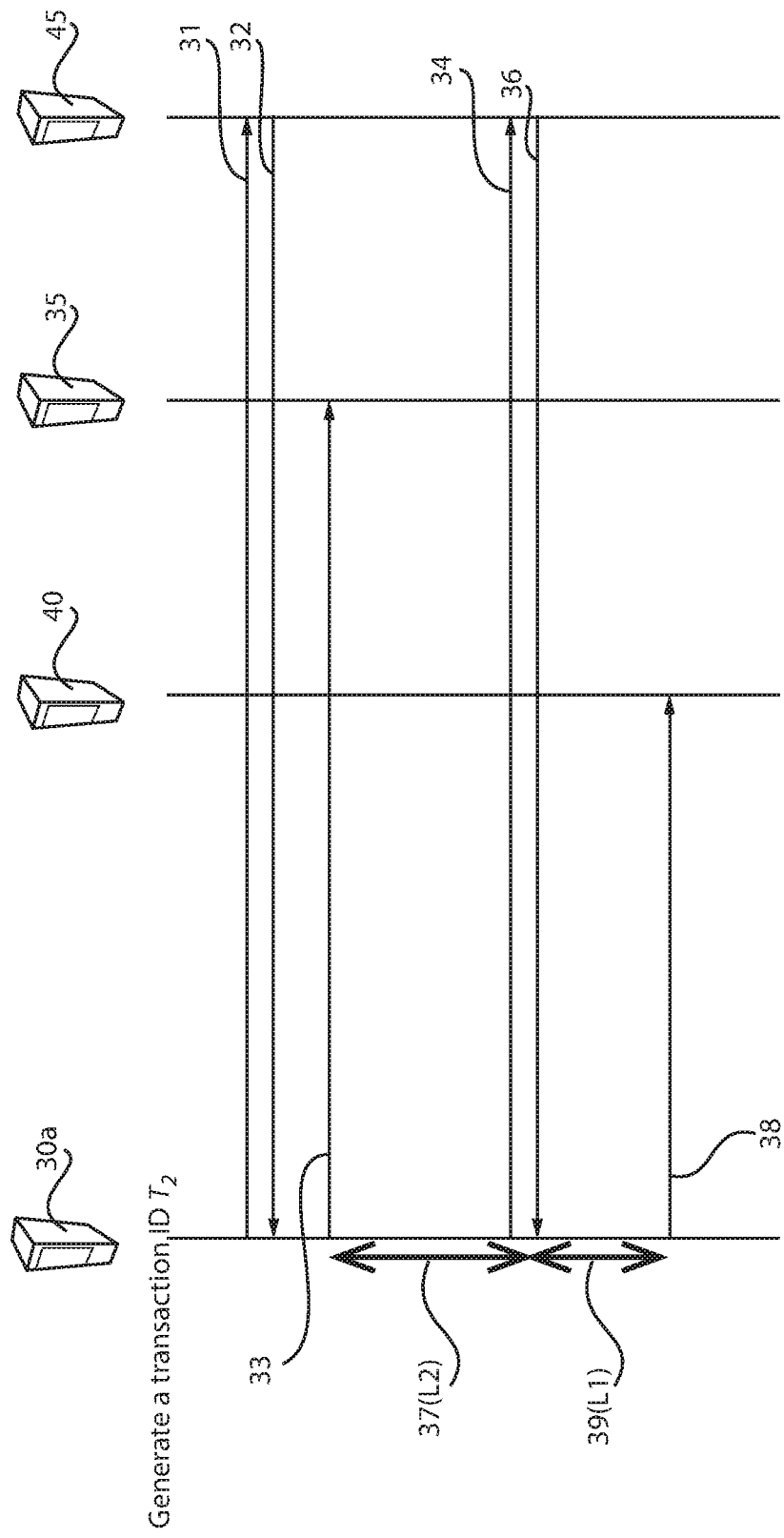
FIG. 3 is a schematic illustrating types of lag times that can occur while processing transactions using NoSQL servers.

FIG. 3 is a schematic further illustrating some embodiments of types of lag times L1, L2 that can occur while processing transactions using NoSQL servers. FIG. 3 illustrates a schematic depicting the relationship of transaction processing and time lags between the clients 30, the data storage servers 35 (DS servers), transaction management server 40 (TM server), timestamp server (TS server) 45. A sequence may begin with generating a transaction ID, e.g., $T_2$, by the client 30. The client 30 ($C_2$) calls for a new timestamp for the start time ($T_{start}$ or $T_{S2}$) from the time stamp server (TS server) 45, as illustrated by arrow 31. The time stamp server (TS server) 45 may then return a new timestamp $t_{S2}$ to the client 30, as illustrated by arrow 32.

Still referring to FIG. 3, the client 30 ($C_2$) can than add a new version of a value for the transaction with metadata, e.g., the transaction ID $T_2$, and write that data to the data storage server 35, as depicted by arrow 33. Thereafter, the client 30 ($C_2$) calls for a new timestamp for from the time stamp server (TS server) 45, as illustrated by arrow 34. In response to the call for the new timestamp, the time stamp server (TS server) 45 returns a timestamp ($T_{C2}$) to the client 30 ($C_2$) as identified by the arrow having reference number 36. The arrow identified by reference number 37 illustrates a time lag, i.e., second time lag (L2), that exists between the data store time identified by the arrows having reference number 33 and the commit timestamp ($T_{committed}$ or $T_{C2}$) identified by reference number 34, 36. In some embodiments, the client 30 can determine that the transaction $T_2$ is committed at the commit timestamp ($T_{C2}$) after executing the other operations that follows the write transaction (identified by arrow 33) and transmitting a timestamp request from the client to the transaction management server 40 (TM server).

Referring to FIG. 3, the arrow identified by reference number 38 illustrates committing the transaction of the transaction ID with the timestamp $T_{C2}$ by the client 30 to the transaction management server (TM server) 40. The arrow identified by reference number 39 illustrates a time lag, i.e., first time lag (L), that exists between the commit timestamp ($T_{C2}$) that is illustrated by the arrows having reference numbers 34, 36 and the actual time of commitment for the transaction (T), which is represented by the arrow having reference number 39. In some embodiments, the transaction management server (TM server) 40 can determine that the transaction T2 is committed at commit timestamp ($T_{C2}$) after transmitting the commit timestamp ($T_{C2}$) from the timestamp server 45 to the client 30 and a commit request from the client 30 to the transaction management server (TM server) 40. It is noted that the client 30 may write multiples values to the data storage servers 35. The client may fail adding the new version and committing the transaction.

Figure 4:
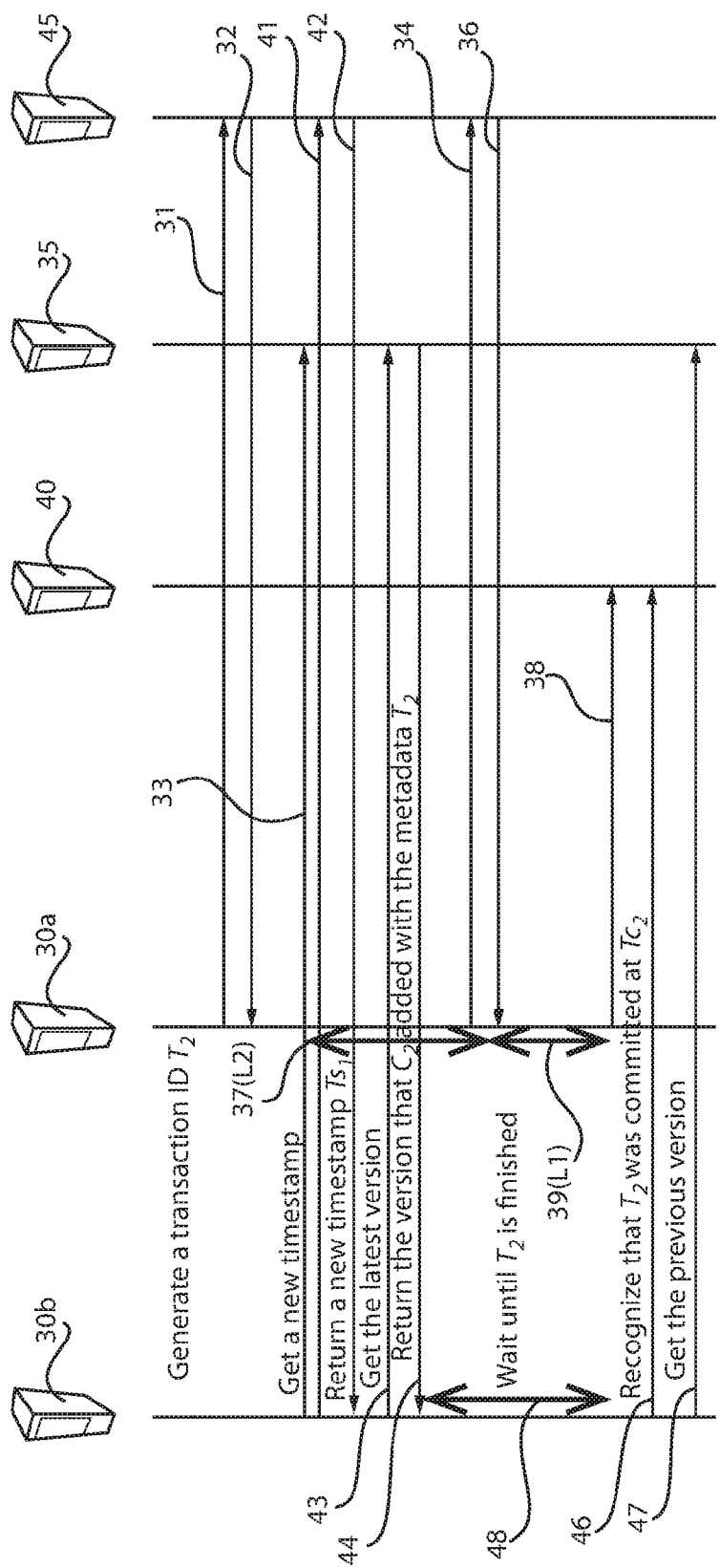
FIG. 4 is a schematic illustrating types of lag times that can occur while processing transactions using NoSQL servers in a Percolator type environment, in accordance with one embodiment of the present disclosure.

The issue caused by the time lags L1, L2 described with reference to FIG. 3 in a conventional system, such as Perculator, is depicted in FIG. 4. In FIG. 4, two clients 30*a* (C1), 30*b* (C2) are depicted in a working relationship with database storage servers 35, transaction management servers 40, and time stamp servers 45. The client identified by reference number 30*b* (C2) in FIG. 4 is similar to the client 30 described in FIG. 3 and is processing a first transaction T2. The arrows identified by reference numbers 31, 32, 33, 34, 36, and 38 in FIG. 4 for the call and return functions between the second clients 30*b* (C2) and the database storage servers 35, the transaction management servers 40, and the time stamp servers 45 have been described above with reference to FIG. 3. Therefore, the description of the arrows identified by reference numbers 31, 32, 33, 34, 36, and 38 in FIG. 3 is suitable to describe the arrows having the same reference numbers in FIG. 4.

FIG. 4 also depicts a first time lag L1 (having reference number 37) and a second time lag L2 (having reference number 39). The arrow identified by reference number 39 illustrates the first time lag (L) that exists between the commit timestamp ($T_{C2}$) that is illustrated by the arrows having reference numbers 34, 36 and the actual time of commitment for the transaction (T), which is represented by the arrow having reference number 39. The arrow identified by reference number 37 illustrates the second time lag (L2), that exists between the data store time identified by the arrows having reference numbers 33 and the commit timestamp ($T_{C2}$) identified by reference number 34, 36.

The client identified by reference number 30a (C1) is FIG. 4 is a first client and is processing a second transaction T1. The first client 30a (C1) cannot read any versions of the data written in the first transaction T2, until the first transaction T2 is finished. Because the first client (C1) 30a does not communicate with the second client (C2) 30b, the first client (C1) 30a cannot determine that the first transaction T2 will be committed after the time stamp $T_{S1}$ for the second transaction T1. The sequence employed by the first client (C1) 30a may include a request for a time stamp $T_{S1}$ to the time stamp server 45, as illustrated by the arrow having reference number 41. The time stamp server (TS server) 45 may then return a new timestamp $t_{S1}$ to the first client (C1) 30a, as illustrated by arrow 42.

Still referring to FIG. 4, the first client (C1) 30a can than request the latest version of the value for the transaction with metadata, e.g., the transaction ID $T_2$, from the data storage server 35, as depicted by arrow 43. The arrow identified by reference number 44 illustrates the data storage server 35 returning the version that the second client (C2) 30b added the metadata to, e.g., the transaction ID $T_2$, to the first client (C1) 30a. The arrow identified by 48 illustrates that the first client (C1) 30a must wait until the first transaction T2 is finished before continuing. The arrow identified by reference number 46 illustrates that after the first transaction T2 is finished, the first client (C1) 30a can recognize that the first transaction T2 was committed at the commit timestamp $T_{C2}$ through interaction with the transaction management server 40. Thereafter, the first client (C1) 30a may then get the previous version of the value by making a request to the database server 35b, as illustrated by the arrow reference number 47.

In some embodiments, to overcome the above difficulties in managing time, i.e., managing the first and second time lags L1, L2, methods, systems and computer program products having been provided in which when a first client (C1) 30a attempts to read a value that another second client, e.g., client 30b (C2), is updating in a transaction T2, the first client (C1) 30a adds a time constraint to commit $T_{C2}$, i.e., the commit timestamp ($T_{C2}$). For example, when first client (C1) 30a fetches a value that the first transaction T2 wrote, the first client checks the commit timestamp ($T_{C2}$). For example, the first client (C1) 30a may communicate with the transaction management server (TM) 40 that manages the transaction T2.

If a commit timestamp ($T_{C2}$) is not determined, the first client (C1) 30a sends a time stamp $T_{S1}$ or more later clock to the transaction management server of the transaction T2 as $T_{after}$. If the transaction management server (TM) 40 has determined the commitment of the transaction T2, the transaction management server replies back to the first client (C1) 30a.

If the transaction management (TM) server 40 has not determined the commitment of the transaction T2, the transaction management (TM) server 40 adds a constraint, such as "T2 can be committed after $T_{after}$". If the second client (C2) 30b request to commit the transaction $T_2$ with the timestamp $T_{C2}$ that is earlier than $T_{after}$, the transaction management (TM) server 40 declines the request, then the second client (C2) 30b gets a new timestamp $T_{C2}'$, then sends it to the transaction management (TM) server 40.

Figure 5:
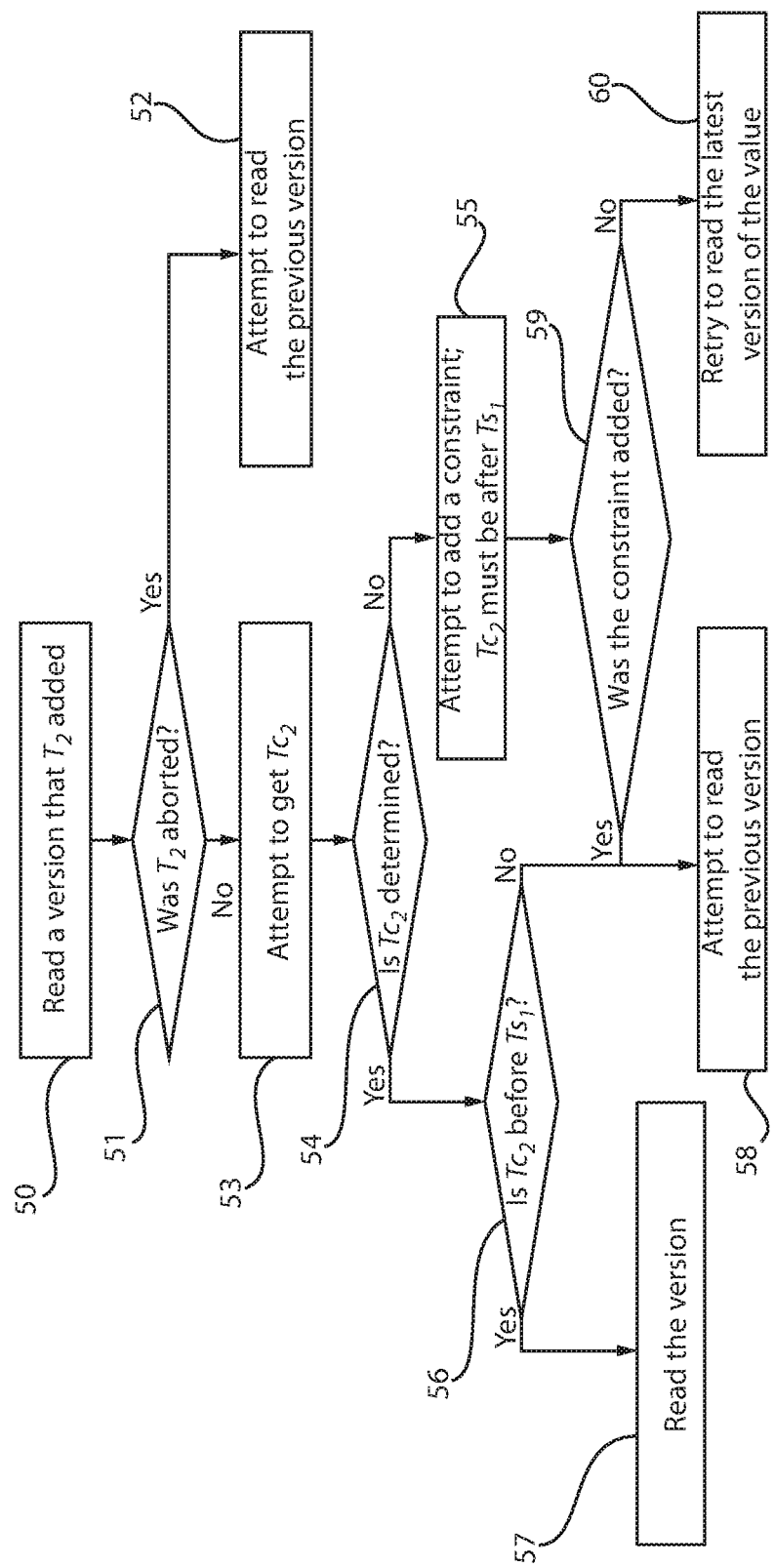
FIG. 5 is a flow/block diagram illustrating one embodiment of read operation in a transaction in NoSQL databases, in accordance with one embodiment of the present disclosure.

FIG. 5 is a flow/block diagram illustrating one embodiment of read operation in a transaction in NoSQL databases, in accordance with one embodiment of the present disclosure.

The read operation is in a transaction T1 by a first client (C1) 30a that starts at timestamp $T_{S1}$. In this embodiment, after getting the previous version of the value in the transaction, the client processes the same flow for the transaction that wrote the version to read the version. Step 50 of the method flow depicted in FIG. 5 includes the first client (C1) 30a reading a version of the transaction T2 that has been added by the second client 30b. At step 51, a determination is made whether the transaction T2 has been aborted. If the transaction T2 has been aborted, the first client 30a attempts to read a previous version at step 52. If the transaction T2 has not been aborted, the read operation continues to step 53, at which the second client 30b attempts to get a commit timestamp $T_{C2}$ from the transaction management server 40.

The read operation continues at step 54, wherein the first client (C1) 30a makes a determination of whether the transaction T2 at commit timestamp $T_{C2}$ has not or has been determined, i.e., committed. If the transaction T2 at commit timestamp $T_{C2}$ has not been determined, the first client (C1) 30a adds a constraint, e.g., $T_{C2}$ must be after $T_{S1}$ at step 55. If the constraint is successfully added at step 59, the first client can retry to read the latest version of the value of the transaction T2 at step 60. If the constraint was not successfully added at step 59, the first client can attempt to read the previous version of the value of the transaction T2 at step 58.

Referring back to step 54, if the transaction T2 at commit timestamp $T_{C2}$ has been determined, a determination is made if the commit timestamp $T_{C2}$ is before the start timestamp $T_{S1}$ for the first client (C1) 30a. If the commit timestamp $T_{C2}$ is before the start timestamp $T_{S1}$, the first client (C1) 30a may read the version of the value at step 57. If the commit timestamp $T_{C2}$ is not before the start timestamp $T_{S1}$, the first client (C1) 30a may read a previous version of the value at step 58.

Figure 6:
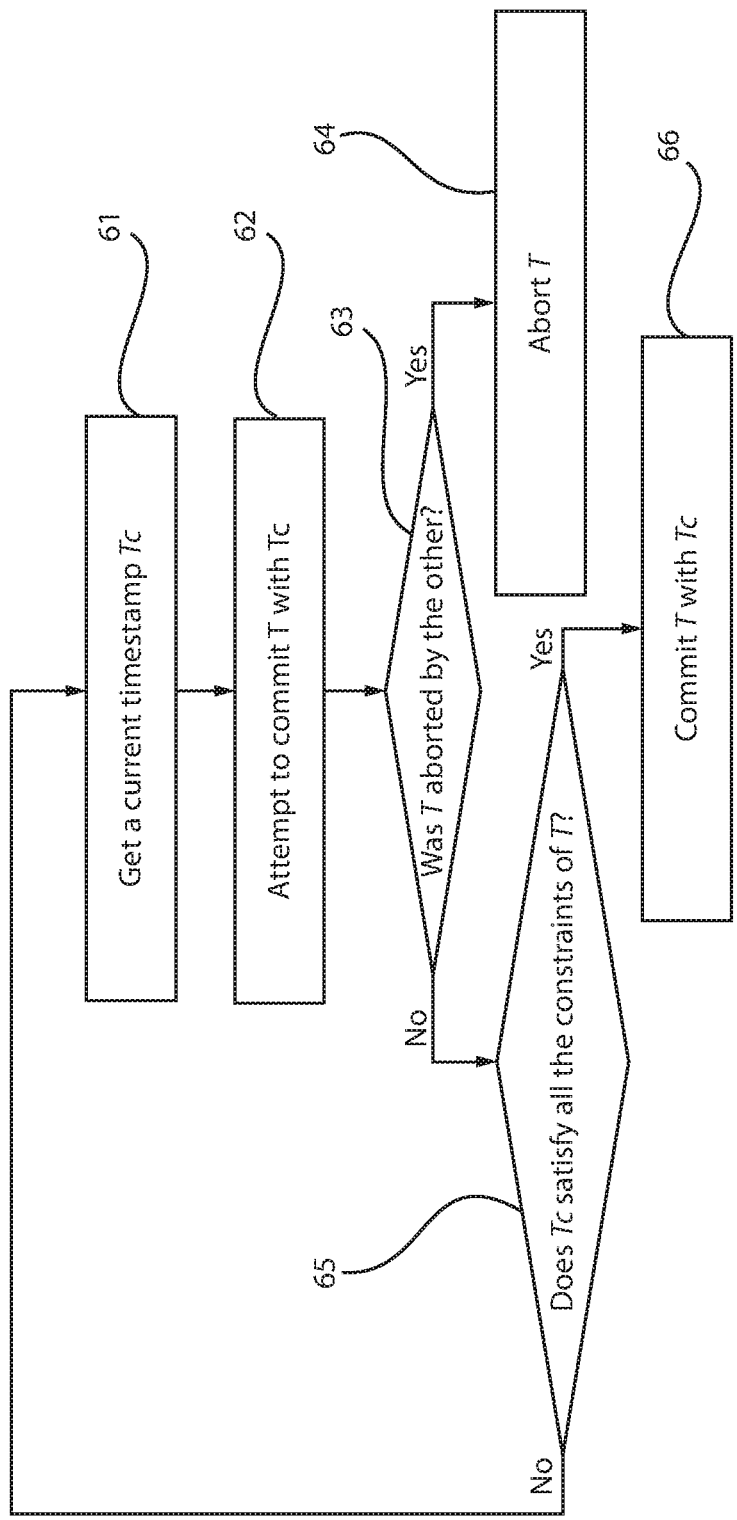
FIG. 6 is a flow/block diagram illustrating one embodiment of commit operation in a transaction in NoSQL databases, in accordance with one embodiment of the present disclosure.

FIG. 6 is a flow/block diagram illustrating one embodiment of commit operation in a transaction in NoSQL databases, in accordance with one embodiment of the present disclosure. The commit operation by a client may begin at step 61, which includes the client getting a current timestamp Tc from the timestamp server 45. At step 62, the client attempts to commit the transaction with the time stamp Tc. A determination is then made if the transaction was aborted by one of the other clients at step 63. If one of the other clients aborted the transaction at step 63, the transaction is aborted by the client at step 64. If the other clients have not aborted the transaction at step 63, a determination is made if the time stamp Tc meets all the constraints for the transaction T at step 65. If the timestamp Tc does not meet the constraints, the client goes back to step 61 and gets a current timestamp. If the timestamp Tc does meet the constraints, the client commits the transaction with the current time stamp Tc at step 66.

Figure 7:
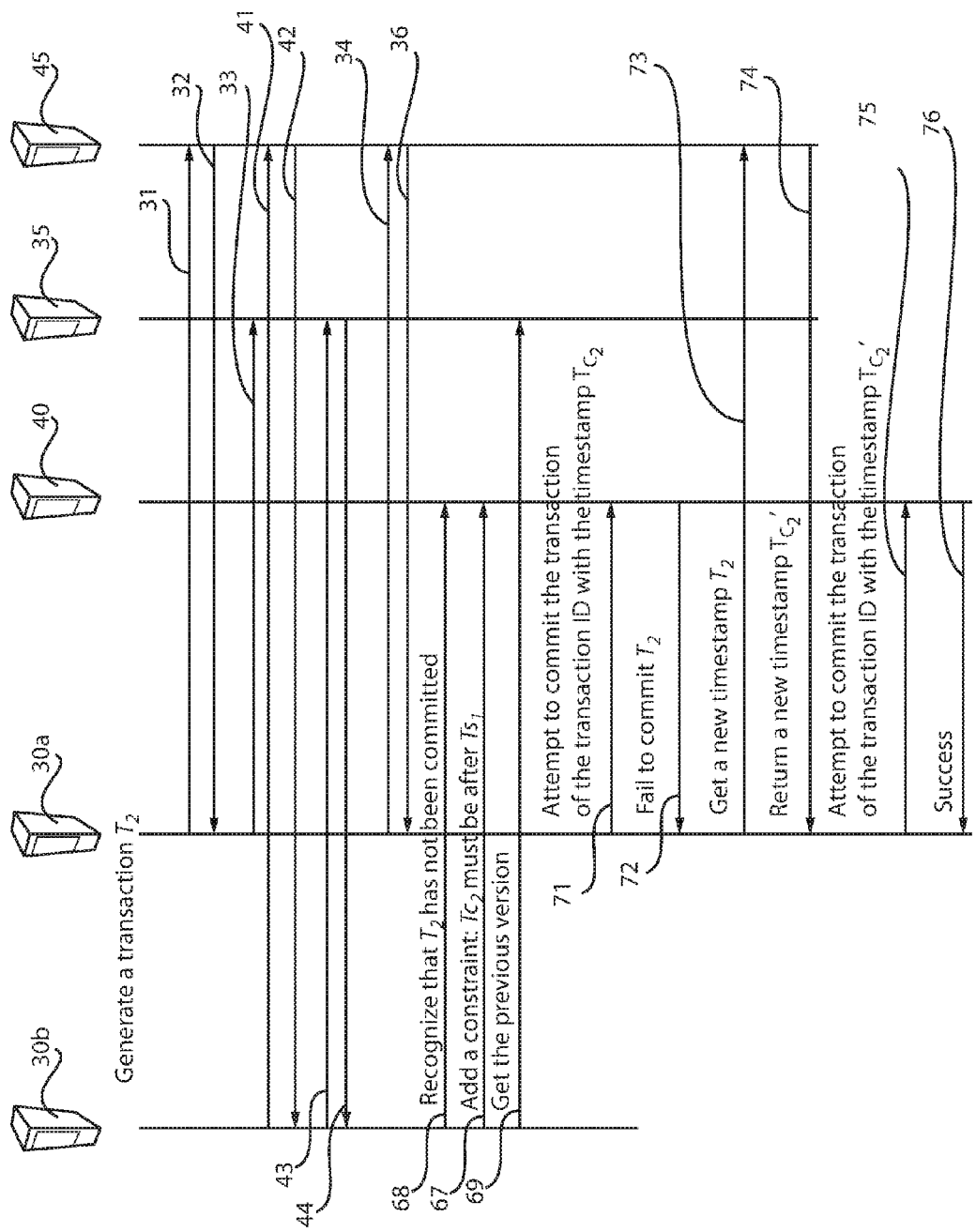
FIG. 7 is a schematic illustrating one embodiment of a method using order constraints for processing transactions with snapshot isolation on non-transactional NoSQL servers.

FIG. 7 is a schematic illustrating one embodiment of a method using order constraints for processing transactions with snapshot isolation on non-transactional NoSQL servers. The system includes a first client (C1) 30a and a second client (C2) 30b depicted in a working relationship with database storage servers 35, transaction management servers 40, and time stamp servers 45. The client identified by reference number 30b in FIG. 7 is the second client, and is similar to the second client (C2) 30b depicted in FIG. 4, as well as being similar to the client 30 described in FIG. 3 and is processing a first transaction T2. The arrows identified by reference numbers 31, 32, 33, 34 and 36 in FIG. 7 for the call and return functions between the second client (C2) 30b and the database storage servers 35, the transaction management servers 40, and the time stamp servers 45 have been described above with reference to FIGS. 3 and 4. Therefore, the description of the arrows identified by reference numbers 31, 32, 33, 34 and 36 in FIG. 3 is suitable to describe the arrows having the same reference numbers in FIG. 4.

The client identified by reference number 30a (C1) is FIG. 7 is a first client and is processing a second transaction T1. The arrows identified by reference numbers 31, 32, 33, 34 and 36 in FIG. 7 for the call and return functions between the first client (C1) 30a and the database storage servers 35, the transaction management servers 40, and the time stamp servers 45 have been described above with reference to FIGS. 3 and 4. Therefore, the description of the arrows identified by reference numbers 31, 32, 33, 34 and 36 in FIG. 3 is suitable to describe the arrows having the same reference numbers in FIG. 4.

Referring to FIG. 7, in this embodiment, the first client (C1) 30a does not wait till the finish of the transaction T, i.e., that the transaction T2 is committed, to read the value from the database server (DS) 35. When the first client (C1) 30a attempts to read a value that the other client, e.g., second client (C2) 30b, is updating in a transaction T2, the first client (C1) 30a adds a time constraint to the commit time $T_{C2}$, i.e., commit timestamp $T_{C2}$, as illustrated by the arrow having reference number 67 in FIG. 7. More specifically, the first client (C1) 30a may add the time constraint that the time commit timestamp $T_{C2}$ for the transaction by the second client (C2) 30b is after the start timestamp $T_{S1}$ for the transaction by the first client (C1) 30a, i.e., "$T_{C2}$ must be after $T_{S1}$" as illustrated by the arrow having reference number 67 in FIG. 7. In one embodiment, this is illustrated by step 55 of the method depicted in FIG. 5.

In some examples, when the first client (C1) 30a fetches a value that the transaction T2 wrote, the first client (C1) 30a may check the commit timestamp $T_{C2}$. For example, the first client (C1) 30a may communicate with the transaction management (TM) server that manages the transaction T2, as illustrated by the arrow having reference number 68 in FIG. 7.

The arrow identified by reference number 69 extending from the first client (C1) 30a to the data storage server 35 illustrates an attempt by the first client (C1) 30a to read a previous version of the value, in which it has been determined that the commit timestamp $T_{C2}$ for the transaction T2 of the second client (C2) 30b is before the start timestamp TS 1 of the first client 30a, as illustrated by steps 54, 56 and 58 of FIG. 5.

If the transaction commit timestamp $T_{C2}$ is not determined yet, the first client (C1) 30a sends $T_{s1}$ or more later clock to the transaction management (TM) 40 server of the transaction T2 as $T_{after}$ as the arrow 67 in FIG. 7. If the transaction management (TM) server 40 has determined the commitment of the transaction T2, the transaction management (TM) server 40 replies back to the client 30b. This is illustrated by the arrow identified by reference numbers 71 and 72 as depicted in FIG. 7.

Still referring to FIG. 7, if the TM server 40 has not determined the commitment of the transaction T2, the TM server adds a constraint "T2 can be committed after $T_{after}$". If the second client 30b requests to commit T2 with $T_{C2}$ that is earlier than $T_{after}$, the transaction management (TM) server declines the request, then the second client 30a gets a new timestamp $T_{c2}'$, then sends it to the transaction management (TM) server 40, as illustrated by the arrows having reference numbers 73, 74.

Still referring to FIG. 7, the arrow identified by reference number 75 illustrates an attempt by the second client (C2) 30b to commit the transaction of the transaction ID with the timestamp $T_{c2}'$ to the transaction management (TM) server 40. The arrow identified by reference number 76 extending from the transaction management (TM) server 40 to the second client (C2) 30b illustrates an indication of a successful commit. The commit transactions have been clearly described above with reference to FIG. 6.

Figure 8:
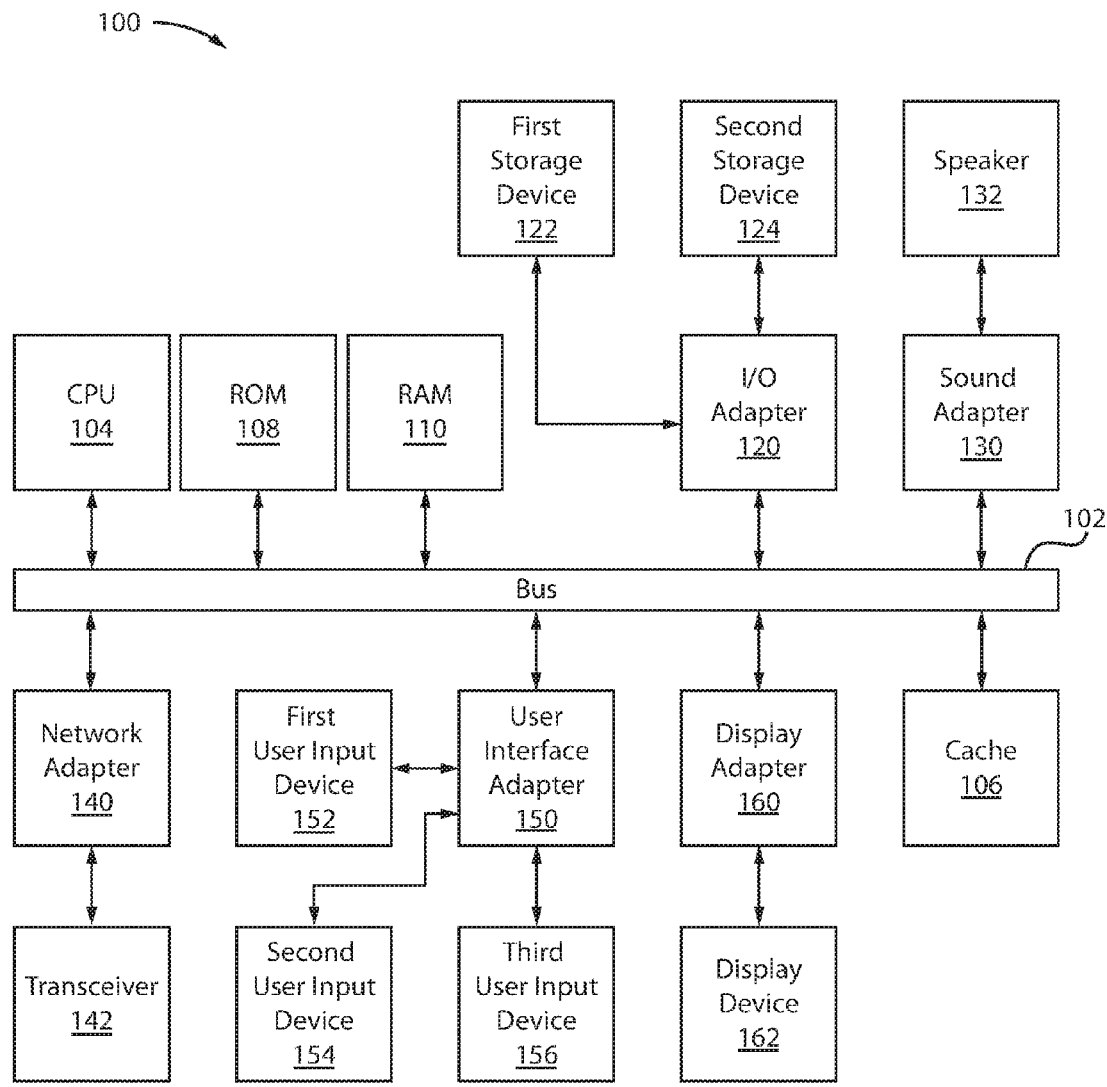
FIG. 8 shows an exemplary processing system to which the present principles may be applied, in accordance with an embodiment of the present principles.

FIG. 8 shows an exemplary processing system 100 to which the present principles may be applied as clients 30a, 30b interacting with the NoSQL database depicted in FIGS. 5, 6 and 7. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 9:
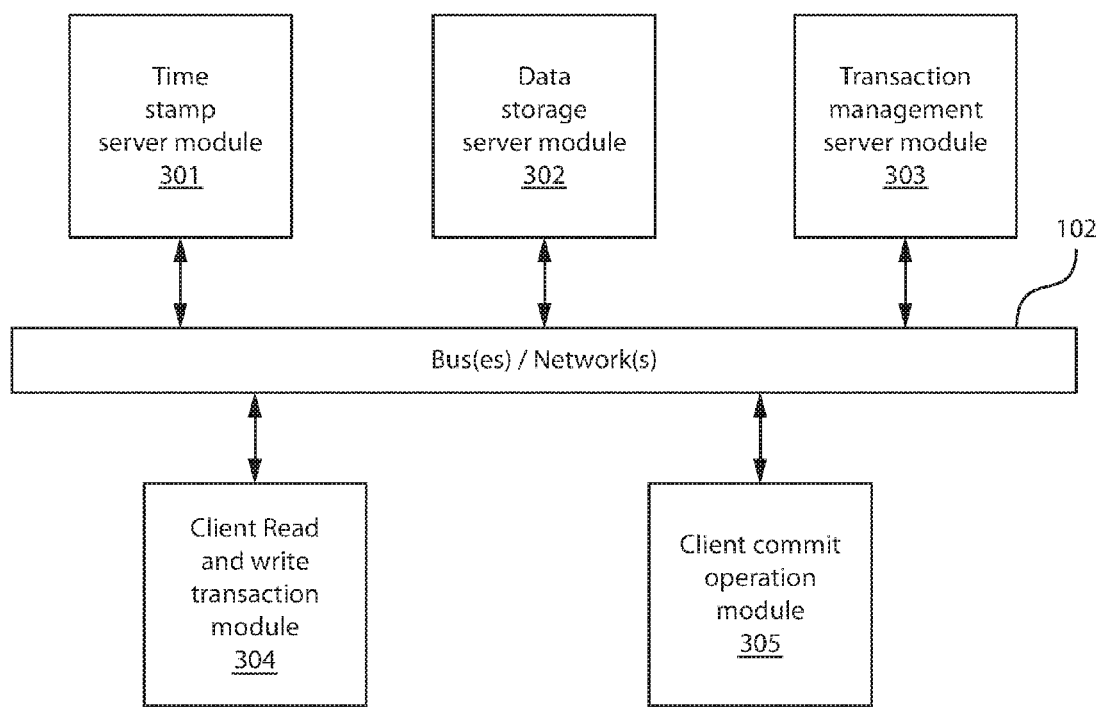
FIG. 9 is a block diagram illustrating an exemplary system for using order constraints for processing transactions with snapshot isolation on non-transactional NoSQL servers, in accordance with an embodiment of the present principles.

Moreover, it is to be appreciated that system 300 described below with respect to FIG. 9 is a system for implementing respective embodiments of the present principles. Part or all of processing system 100 may be implemented in one or more of the elements of system 300. Further, it is to be appreciated that processing system 100 may perform at least part of the method described herein including, for example, at least part of methods described with reference to FIGS. 5-7.

FIG. 9 shows an exemplary system 300 for employing order constraints for processing transactions in non-transactional NoSQL environments, in accordance with an embodiment of the present principles. The system 300 for managing a commitment time in a NoSQL environment includes a time stamp server module 301 for managing time stamps comprised of start timestamps and commit timestamps to at least a first client (C1) 30*a* and a second client (C2) 30*b*; a data storage server module 302 that the at least said first client (C1) 30*a* and said second client (C2) 30*b* can read and write data to; and a transaction management server module 303 that determines when a first client (C1) 30*a* reads a value from said data storage server (DS) in a first transaction that is being updated by the second client (C2) 30*b* in a second transaction whether the value has been committed. If it is determined that the value has not been committed, the transaction management server module 303 causes the second client to commit after the start time of the first transaction. The system depicted in FIG. 9 may also include a client read and write transaction module 304 and a client read and write transaction module 305. Each of the aforementioned modules may include a module of memory containing instructions to be executed by a hardware processor.

In the embodiment shown in FIG. 9, the aforementioned elements thereof are interconnected by bus(es)/network(s) 102. However, in other embodiments, other types of connections can also be used. Moreover, in an embodiment, at least one of the elements of system 300 is processor-based, e.g., hardware processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 300 are readily determined by one of ordinary skill in the art, given the teachings of the present principles provided herein, while maintaining the spirit of the present principles.

The time stamp server module 301 and its function has been described in greater detail above in the description of the functionality of the time stamp server (TS) 45, which is described above with reference to FIGS. 2, 5, 6 and 7. The transaction management server module 303 and its function has been described in greater detail above in the description of the functionality of the transaction management server (TM) 35, which is described above with reference to FIGS. 2, 5, 6 and 7. The data storage server module 302 and its function has been described in greater detail above in the description of the functionality of the data storage server (DS) 40, which is described above with reference to FIGS. 2, 5, 6 and 7. The client read and write transaction module 304 may include instructions for the operation of the first and second clients (C1,C2) 30*a*, 30*b* as used in the method sequence for a read operation in a transaction T that started at time stamp $T_{S1}$, as described in FIG. 5. The client commit operation module 305 may include instructions for the operation of the first and second clients (C1,C2) 30*a*, 30*b* as used in the commit operation sequence for the transaction T, as described in FIG. 6.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
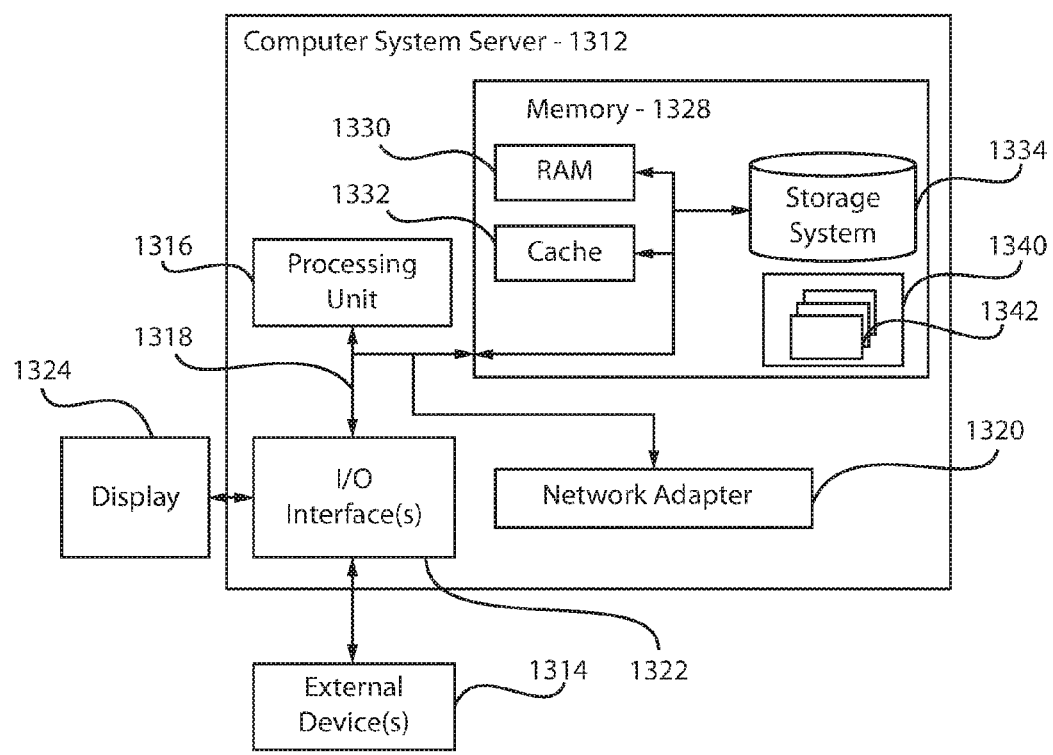
FIG. 10 shows an exemplary cloud computing node, in accordance with an embodiment of the present principles.

Referring now to FIG. 10, a schematic of an example of a cloud computing node 1310 is shown. Cloud computing node 1310 is only one example of a suitable cloud computing node and is not intended to suggest any limitation as to the scope of use or functionality of embodiments of the invention described herein. Regardless, cloud computing node 1310 is capable of being implemented and/or performing any of the functionality set forth hereinabove.

In cloud computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1312 in cloud computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, memory 1328 may include at least one program product having a set (e.g., at least one) of program modules that are configured to carry out the functions of embodiments of the invention.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein. For example, the program modules 1342 can include the modules described with reference to FIG. 9.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.)

that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

Figure 11:
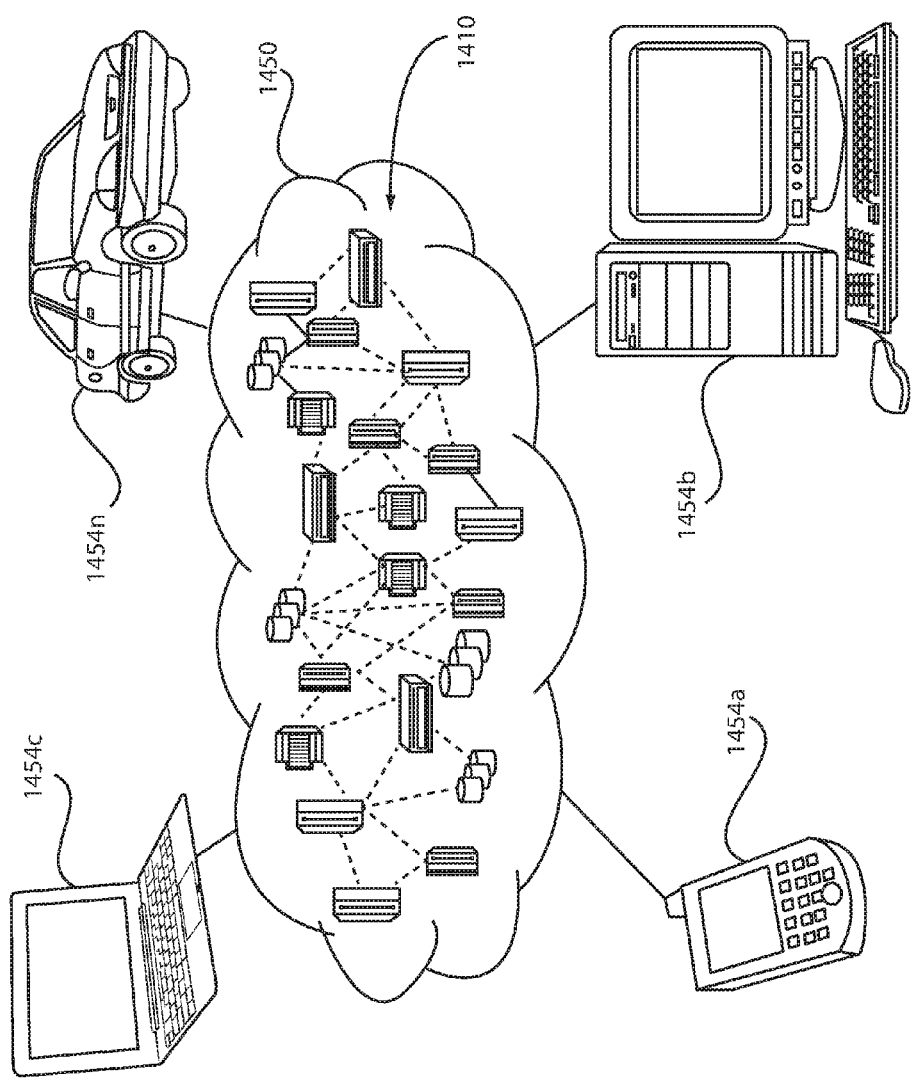
FIG. 11 shows an exemplary cloud computing environment, in accordance with an embodiment of the present principles.

Referring now to FIG. 11, illustrative cloud computing environment 1450 is depicted. As shown, cloud computing environment 1450 comprises one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 15 are intended to be illustrative only and that computing nodes 1410 and cloud computing environment 1450 can communicate with any type of computerized device over any type of network and/or network addressable connection (e.g., using a web browser).

Figure 12:
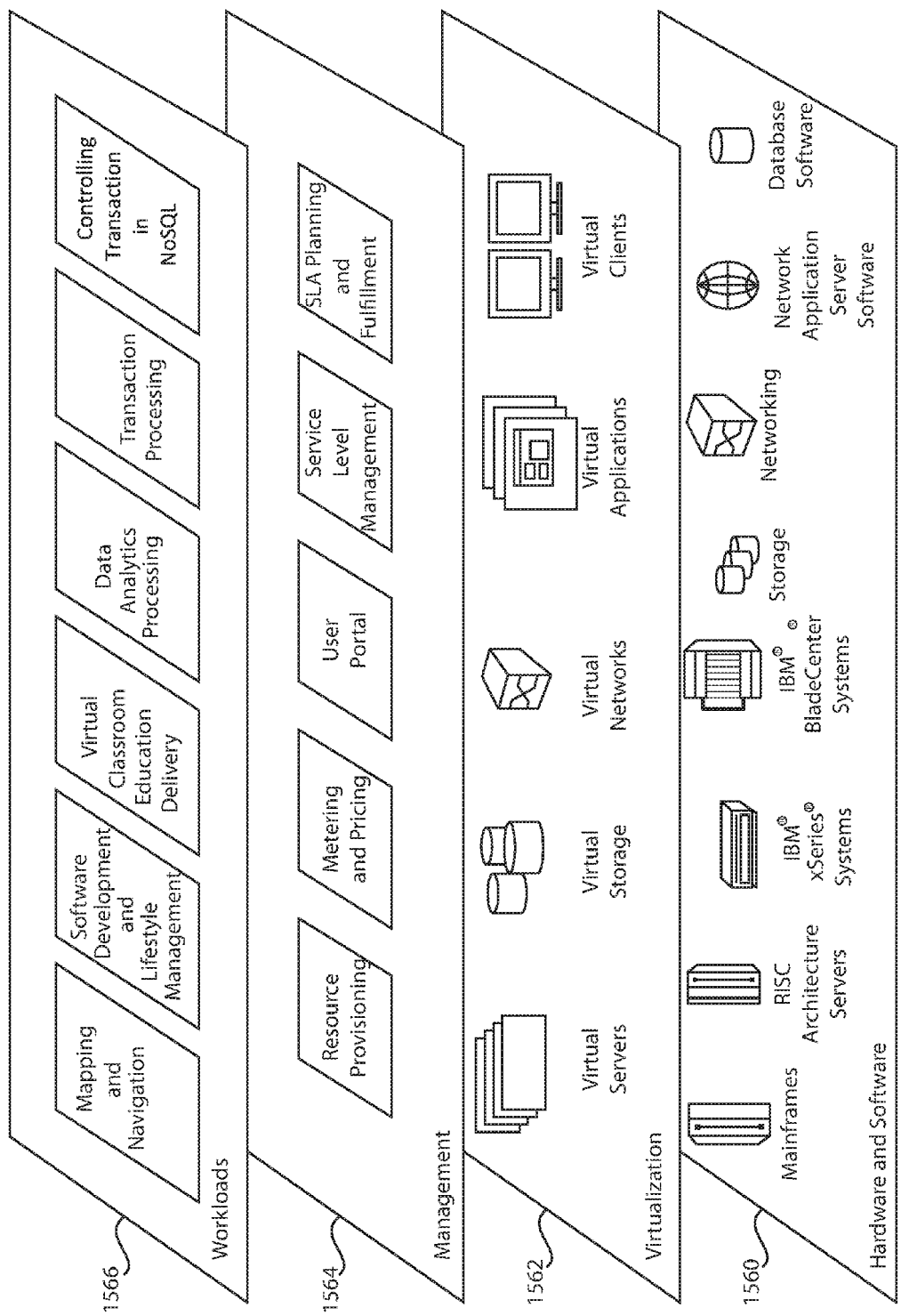
FIG. 12 shows exemplary abstraction model layers, in accordance with an embodiment of the present principles.

Referring now to FIG. 12 a set of functional abstraction layers provided by cloud computing environment 1550 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 1560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and providing for transactions in NoSQL databases.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of managing a commitment time comprising:
receiving, with at least a transaction management server in an NoSQL environment, communications related to a first transaction from at least a first client, and communications related to a second transaction from at least a second client;
determining, with the transaction management server, when the first client reads a value in the first transaction that is being updated by the second client in the second transaction whether the second transaction has been committed; and applying, with the transaction management server, a constraint provided by a commit timestamp to the second client which causes the second client to commit after the start time of the first transaction in response to the first client reading the value before the second transaction has been committed.

2. The method of claim 1, wherein in response to the first client reading the value before the second transaction has been committed, the first client notifies the transaction management server of a time that is after the start time, as a commitment time, and when the second client issues a commitment request for the second transaction, the transaction management server delays the commitment of the second transaction until at or after the commitment time.

3. The method of claim 2, wherein the start time is transmitted to the at least one of the first client and the second client with a start timestamp by a timestamp server.

4. The method of claim 2, wherein the commit time is transmitted to the at least one of the first client and the second client with the commit timestamp by a timestamp server.

5. The method of claim 2, wherein the value that is being updated by the second client is being committed to a data storage server.

6. The method of claim 5, wherein the first and second client read and write data to the data storage server.

7. The method of claim 1, wherein the method employs snapshot isolation.

8. The method of claim 1, wherein the transaction management server delays the commitment of the second transaction until at or after the commitment time using a transaction constraint.

9. The method of claim 1, wherein the first client does not wait until the second transaction is finished to read the value.

10. A system for managing a commitment time in a NoSQL environment comprising:
    a time stamp server for managing timestamps comprised of start timestamps and commit timestamps to at least a first client and a second client;
    a data storage server that the at least the first client and the second client can read and write data to; and
    a transaction management server that:
        determines when the first client reads a value from said data storage server in a first transaction that is being updated by the second client in a second transaction whether the second transaction has been committed; and
        applies a constraint provided by a commit timestamp to the second client which causes the second client to commit after the start time of the first transaction in response to the first client reading the value before the second transaction has been committed.

11. The system of claim 10, wherein in response to the first client reading the value before the second transaction has been committed, the first client notifies the transaction management server of a time that is after the start time, as a commitment time, and when the second client issues a commitment request for the second transaction, the transaction management server delays the commitment of the second transaction until at or after the commitment time.

12. The system of claim 11, wherein the system employs snapshot isolation.

13. The system of claim 11, wherein the value that is being updated by the second client is being committed to the data storage server.

14. The system of claim 11, wherein the transaction management server delays the commitment of the second transaction until at or after the commitment time using a transaction constraint.

15. The system of claim 11, wherein the time management server, the data storage server, and the transaction management server are in NoSQL database servers.

16. The system of claim 11, wherein the first client does not wait until the second transaction is finished to read the value.

17. A non-transitory computer readable storage medium comprising a computer readable program for managing a commitment time in a NoSQL environment, wherein the computer readable program when executed on a computer causes the computer to perform the steps of:
    receiving, with at least a transaction management server in an NoSQL environment, communications related to a first transaction from at least a first client and communications related to a second transaction from at least a second client;
    determining, with the transaction management server, when the first client reads a value in the first transaction that is being updated by the second client in the second transaction whether the second transaction has been committed; and
    applying, with the transaction management server, a constraint provided by a commit timestamp to the second client which causes the second client to commit after the start time of the first transaction in response to the first client reading the value before the second transaction has been committed.

18. The non-transitory computer readable storage medium of claim 17, wherein in response to the first client reading the value before the second transaction has been committed, the first client notifies the transaction management server of a time that is after the start time, as a commitment time, and when the second client issues a commitment request for the second transaction, the transaction management server delays the commitment of the second transaction until at or after the commitment time.

19. The non-transitory computer readable storage medium of claim 18, wherein the value that is being updated by the second client is being committed to a data storage server.

20. The non-transitory computer readable storage medium of claim 18, wherein the transaction management server delays the commitment of the second transaction until at or after the commitment time using a transaction constraint.

* * * * *